United States Patent
Raskovic et al.

(10) Patent No.: US 11,354,489 B2
(45) Date of Patent: *Jun. 7, 2022

(54) INTELLIGENT INFERENCES OF AUTHORING FROM DOCUMENT LAYOUT AND FORMATTING

(71) Applicant: Microsoft Technology Licensing, LLC, Redmond, WA (US)

(72) Inventors: Milos Raskovic, Belgrade (RS); Aljosa Obuljen, Belgrade (RS); Milan Sesum, Belgrade (RS); Dragan Slaveski, Belgrade (RS); Milos Lazarevic, Belgrade (RS); Nikola Terzic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,244

(22) Filed: May 5, 2021

(65) Prior Publication Data
US 2021/0256202 A1 Aug. 19, 2021

Related U.S. Application Data

(63) Continuation of application No. 15/788,131, filed on Oct. 19, 2017, now Pat. No. 11,030,537.
(Continued)

(51) Int. Cl.
*G06F 40/151* (2020.01)
*G06F 40/16* (2020.01)
(Continued)

(52) U.S. Cl.
CPC .......... *G06F 40/151* (2020.01); *G06F 16/116* (2019.01); *G06F 16/168* (2019.01);
(Continued)

(58) Field of Classification Search
CPC .... G06F 40/151; G06F 16/116; G06F 16/168; G06F 16/93; G06F 40/117; G06F 40/131;
(Continued)

(56) References Cited

U.S. PATENT DOCUMENTS

2004/0267693 A1* 12/2004 Lowe ...................... G06F 16/93
2008/0091728 A1* 4/2008 Diederiks ............ G11B 27/105
(Continued)

OTHER PUBLICATIONS

"Office action Issued in European Patent Application No. 18743135. 8", dated Sep. 9, 2021, 7 Pages.

*Primary Examiner* — Keith D Bloomquist

(57) ABSTRACT

Non-limiting examples of the present disclosure describe processing that generates intelligent inferences of authoring from analysis of attributes associated with a digital file being imported in an application/service. Examples described herein are configured to work with any type of application/service including an authoring application/service. For instance, a request to import a digital file is received in an application/service. The application/service may be configured to analyze the digital file and generate authoring inferences based on an analysis of attributes of the digital file. For example, a conversion data model may be utilized to identify a file type of the digital file, analyze attributes of the identified digital file (e.g. content portions, layout, formatting, metadata, etc.) and output file data in a format that is tailored for the application/service based on authoring inferences. A converted representation of the digital file is surfaced in the application/service based on output of the file data.

20 Claims, 6 Drawing Sheets

Related U.S. Application Data

(60) Provisional application No. 62/563,014, filed on Sep. 25, 2017.

(51) Int. Cl.
| | |
|---|---|
| *G06F 40/117* | (2020.01) |
| *G06F 40/131* | (2020.01) |
| *G06F 40/143* | (2020.01) |
| *G06F 40/14* | (2020.01) |
| *G06F 16/93* | (2019.01) |
| *G06F 16/16* | (2019.01) |
| *G06F 16/11* | (2019.01) |
| *G06N 5/04* | (2006.01) |

(52) U.S. Cl.
CPC ............ *G06F 16/93* (2019.01); *G06F 40/117* (2020.01); *G06F 40/131* (2020.01); *G06F 40/14* (2020.01); *G06F 40/143* (2020.01); *G06F 40/16* (2020.01); *G06N 5/04* (2013.01)

(58) Field of Classification Search
CPC ........ G06F 40/14; G06F 40/143; G06F 40/16; G06N 5/04
See application file for complete search history.

(56) References Cited

U.S. PATENT DOCUMENTS

| | | | |
|---|---|---|---|
| 2018/0330156 A1* | 11/2018 | Rakita | G06K 9/00463 |
| 2018/0336183 A1* | 11/2018 | Lee | G06N 5/022 |
| 2019/0138598 A1* | 5/2019 | Albouyeh | G06F 40/10 |

\* cited by examiner

200

INTELLIGENT INFERENCES OF AUTHORING FROM DOCUMENT LAYOUT AND FORMATTING

CROSS-REFERENCE TO RELATED APPLICATIONS

This application hereby claims the benefit of and priority to U.S. Provisional Patent Application No. 62/563,014, entitled "INTELLIGENT INFERENCES OF AUTHORING FROM DOCUMENT LAYOUT AND FORMATTING", filed on Sep. 25, 2017, which is incorporated by reference herein in its entirety. Furthermore, this application is a continuation of and claims priority to U.S. Non-Provisional patent application Ser. No. 15/788,131 entitled "INTELLIGENT INFERENCES OF AUTHORING FROM DOCUMENT LAYOUT AND FORMATTING", filed on Oct. 19, 2017, which is hereby incorporated by reference herein, in its entirety.

BACKGROUND

Converting file data between different formats presents challenges, especially when application/services are working with fixed file formats. File formatting for files may be compatible across different applications/services. For instance, a user may want to take fixed content from a portable document format (PDF) file and create a live, free-flowing version that can be used in an authoring application/service. Typically, applications/services are not configured to evaluate attributes of a file when considering how to import a file from a first file format into an application/service that is configured to work with another file format. Layout and formatting of content in a first file format may not translate to another file format when a file in the first file format is imported to a different application/service. Further, identification of types of data such as titles, headers, captions, etc. may be extremely beneficial for an authoring application/service but not readily identified when a file in a different file format is imported to an authoring application/service.

As such examples described herein are directed to enabling of content mobility across digital documents of different applications/services.

SUMMARY

Non-limiting examples of the present disclosure describe processing that generates intelligent inferences of authoring from analysis of attributes associated with a digital file that is being imported in an application/service. This enables content mobility across digital documents of different applications/services. Examples described herein are configured to work with any type of application/service including an authoring application/service. For instance, a request to import a digital file is received in an application/service. The application/service may be configured to analyze the digital file and generate authoring inferences based on an analysis of attributes of the digital file. For example, a conversion data model may be utilized to identify a file type of the digital file, analyze attributes of the identified digital file (e.g. content portions, layout, formatting, metadata, etc.) and output file data in a format that is tailored for the application/service based on authoring inferences. A converted representation of the digital file is surfaced in the application/service based on output of the file data.

In one example, a digital file is identified for importation into a productivity service. An exemplary productivity service may be any type of application/service that is usable to create content including an authoring application/service. Authoring inferences for conversion of the digital file to a format of the productivity service are generated based on an analysis of: content of the digital file, formatting of the content and a layout of the content. A representation of the digital file that is generated, where the representation of the digital file is tailored for the productivity service based on the generated authoring references. The representation of the digital file may then be surfaced in a user interface of the productivity service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
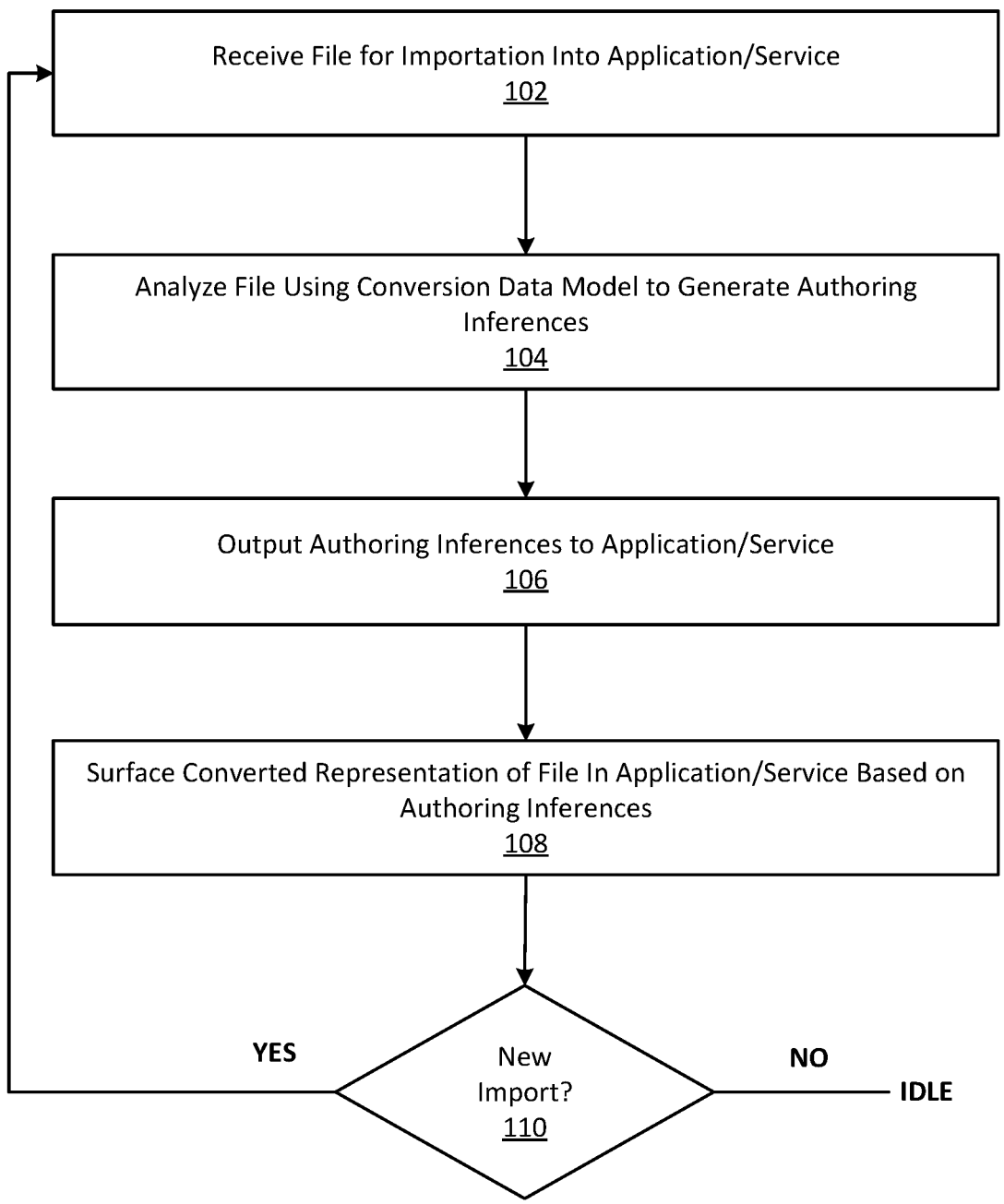
FIG. 1 illustrates an exemplary method related to processing operations for generation and surfacing of file data that is converted from a different file format with which aspects of the present disclosure may be practiced.

Non-limiting examples of the present disclosure describe processing that generates intelligent inferences of authoring from analysis of attributes associated with a digital file that is being imported in an application/service. This enables content mobility across digital documents of different applications/services. Examples described herein are configured to work with any type of application/service including an authoring application/service. An exemplary authoring services (e.g. Microsoft® Sway®, Powerpoint®, etc.) may be configured to work with live free-flowing content portions that may emphasize layout-specific and formatting-specific attributes such as titles, headers, captions, headers, footers, footnotes, grouping of objects, etc.

An exemplary application/service is configured to analyze the digital file and generate authoring inferences based on an analysis of attributes of the digital file. For example, a conversion data model (implemented within an application/service or as a separate service) may be utilized to identify a file type of the digital file, analyze attributes of the identified digital file (e.g. content portions, layout, formatting, metadata, etc.) and output file data in a format that is tailored for the application/service that the file data is being imported to, for example, based on the generated authoring inferences. A converted representation of the digital file is surfaced in the application/service based on output of the file data.

As an example, a user may request an import of file data from other applications/services (e.g. word processing services, spreadsheet services, slide-based presentation services, etc.) into an authoring application/service to create editable content portions. However, as different applications/services work with different file formats, identification of specific attributes of various file formats and actually translating such attributes over to a different application/service is challenging. As commonly seen with importing, content from one application/service does not maintain the same characteristics when being imported to another application/service. For instance, a user may copy a text portion of the PDF file but the formatting and layout may be completely altered when it is imported to another application/service.

Furthermore, applications/services such as authoring application/services may be configured to emphasize specific attributes for content such as headings, footers, footnotes, formatted text portions, groups of objects, etc. When content to be imported possesses attributes that align with specific attributes, an exemplary authoring application/service is configured to identify and emphasize such content attributes or even convert content portions into a different representation that best aligns with usage of the authoring application/service. This improves processing efficiency (e.g. reduced computing cycles, bandwidth/resources) where computing devices associated with an application/service are configured to efficiently convert file data to another format without latency (if at all) as well as improved user interaction with application/services to increase user productivity and satisfaction with a user experience (UX) provided through an application/service (or suite of applications/services).

Moreover, examples described herein further extend to generation of new endpoints (in application/service user interfaces) that enable a plurality of different application/services to provide the functionality described herein. For instance, an authoring tool may be configured to receive and work with content (e.g. different file formats) from different applications/services but other types of applications/services may not be configured to do the same. In one example, a user may wish to convert a file from an authoring application/service to utilize in a word processing application service. An exemplary word processing application/service is not configured to analyze attributes of file data (in an authoring format) to identify how to best present digital content in the word processing application. For instance, a user may have grouped a number of objects (e.g. images) in the authoring application/service but a traditional word processing application may just import the image content without maintaining the grouping arrangement created in the authoring application/service. In another example, a slide-based presentation service may create a section of slides that includes a number of sub-section headings. When that slide content is converted to an authoring application/service, the authoring application/service may analyze the slide content and create a representation of that section of slides in a manner that is best for use in the authoring application/service. For instance, processing described herein analyzes the section of slides, identifies that the sub-sections within that section are all very closely related and merge the slide sub-sections into one authoring section. When the representation created by the authoring application/service is then imported back to a slide-based presentation service, examples described herein enable the slide-based presentation service to recognize that the authoring content can be broken out into a section and multiple sub-sections (e.g. multiple different slides). This cross-over between different applications/services increases processing efficiency and user interaction (and productivity) when working between different application/services. As referenced above, examples described herein are configured to work with any type of application/service.

Accordingly, the present disclosure provides a plurality of technical advantages including but not limited to: generation of content mobility across digital documents of different applications/services, generation of new entry points that enable generation of authoring inferences for conversion/importation of file data in an application/service, creation and application of a new conversion data model to generate authoring inferences and convert/import file data between different file formats (e.g. associated with different applications/services), generation and application of exemplary inference determination rules for generating authoring inferences, improved cross-application communication and interaction (e.g. back-end interfacing between applications/services) to enable content mobility, improved processing efficiency (e.g. reduction in processing cycles, reduction in latency, better management of storage/memory of computing devices) for computing devices that are utilized to convert/import file data and improved user interaction and productivity when using exemplary applications/services including an improved user interface for an application/service, among other examples.

FIG. 1 illustrates an exemplary method 100 related to processing operations for generation and surfacing of file data that is converted from a different file format with which aspects of the present disclosure may be practiced. Method 100 is directed to generation of content mobility across digital documents of different applications/services. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of applications/services, devices, knowledge resources, etc. Processing operations described in method 100 may be implemented by one or more components connected over a distributed network.

Method 100 begins at processing operation 102, where a digital file is received for importation into an exemplary application/service. Examples described herein are configured to work with any type of application/service including an authoring application/service. Reference to an exemplary authoring service (or application) is subsequently made for ease of understanding and comprehension. In processing operation 102, a request to import a file may be made by a user through a user interface (UI) of an exemplary application/service (e.g. authoring service). An exemplary digital file may be in any of a variety of file formats that are generated from a wide variety of applications/services. In some examples, an exemplary conversion data model (subsequently described) may be configured to work with specific applications/services. However, examples herein are not so limited.

An exemplary authoring service (or application) is configured to enable users to create digital presentation documents. As an example, an exemplary authoring service is Microsoft® Sway®. However, examples described herein may extend to any type of digital presentation service without departing from the spirit of the present disclosure. In some examples, the authoring service may be a component of a suite of productivity applications/services that may be configured to interface with other applications/services associated with a platform. For example, the authoring service may be included in a bundled service (e.g. Microsoft® Office365® or the like). Further, an exemplary authoring service may be configured to interface with other internet sources/services including third-party application/services, for example, to enhance functionality of the authoring service.

The authoring service may be configured to enable users to create or edit digital presentation documents, for example, from existing digital content (including different electronic documents). For instance, an existing image file may be imported, where additional content can be added including but not limited to: headings, text, links, media content, etc. Digital presentation documents may comprise but are not limited to: slide-based presentations, websites, social networking posts, word documents, notes, documents, spreadsheet documents, blogs, etc. In alternate examples, digital presentation documents can be created from scratch, where users can generate new types of electronic content and incorporate the new types of digital content (and possibly with other existing digital content) into a digital presentation document. An exemplary authoring service is further configured to enable users to pull content locally (e.g. from a storage of a specific computing device) or retrieve content via a network connection (e.g. retrieve content from a distributed storage, website, etc.).

As an example, a user interface of Sway® is based around a storyline, into which users add a series of cards. An exemplary card is a digital representation for presentation of content, where cards are then filled with digital content. In examples, different cards are available for different types of digital content, and which can be grouped together into sections. Digital content, intended to be the user's narrative can be easily added, removed, edited or reordered. As compared with other existing presentation services, functionality in Sway® provides a more free-flowing and user-friendly user interface, while also improving processing efficiency (e.g. reduction of computing cycles, resources, digital storage, etc.) needed to manage digital presentation documents.

Flow of method 100 may proceed to processing operation 104, where a digital file (that is being imported) is analyzed by an exemplary conversion data model. An exemplary conversion data model is generated for analyzing attributes of digital files for the purpose of tailoring the digital file for conversion/importation into an exemplary application/service (e.g. digital authoring service). The conversion data model is a software-based model, machine-learning model, neural network model, or the like. Types of data models and processing operations for generation and implementation of exemplary data models are known to one skilled in the art.

An exemplary conversation data model is configured to analyze the digital file and generate authoring inferences based on an analysis of attributes of the digital file. For example, the conversion data model may be utilized to identify a file type of the digital file, analyze attributes of the identified digital file (e.g. content portions, layout, formatting, metadata, etc.) and output file data in a format that is tailored for the application/service based on authoring inferences. The conversation data model is configured to identify a type of digital file (e.g. data format) of a file for importation as well as the application/service utilized to create the digital file. Further, the conversation data model is configured to identify a type of application/service (e.g. file format) that the digital file is being imported too. Such information is useful in assisting the conversation data model in generating exemplary authoring inferences that are tailored for an exemplary digital authoring service. For example, a user may be attempting to import a slide-based presentation into an exemplary digital authoring service. In another example, a user may be attempting to import the slide-based presentation to a word processing service.

The conversion data model is configured to apply and execute inference determination rules that are used by the conversion data model for generation of authoring inferences. Inference determination rules are specific operations that are applied to analyze attributes (e.g. content and metadata) of a digital file. Specific inference determination rules may be set to account for any type of analysis comprising but not limited to: identification of types of digital files, evaluation of layout of a digital file/document, evaluation of formatting of content in the digital file/document, evaluation of specific types of content portions, evaluations of grouping of objects in the digital file/document, evaluation of detection of different types of content portions (and/or formatting of content portions), evaluation of metadata of the digital file/document, evaluation of whether content of the digital file/document was previously modified for importation, evaluation of whether specific content portions of the digital file/document should be modified for importation into a different application/service and evaluation of word/grammar correction, among other examples. It is to be understood that the present disclosure may further extend to varying types of rules (with varying level of specificity) that stem from examples described herein without departing from the spirit of the present disclosure.

Authoring inferences refer to results of analyzing attributes of a digital file, for example, under a lens that accounts for a type of application/service that the digital file is being imported to. Inference determination rules may be modifiable over time, where rules can be created, deleted, changed, etc. For instance, an exemplary conversion data model may be a deep-learning model that is configured to update over time based on analysis of telemetric data and/or user behaviors through interaction with exemplary applications/services. Examples of specific inference determination rules and generation of specific authoring inferences are subsequently referenced for further understanding. As an example, authoring inferences for conversion of the digital file to a format of the productivity service are generated by the conversion data model based on an analysis of: content of the digital file, formatting of the content and a layout of the content, among other attributes. The conversion data model may identify an original file format of the digital file and a file format recognized by the productivity service and generate the authoring inferences based on a mapping of the original file format to the file format recognized by the productivity service, among other attributes.

In one example, an exemplary inference determination rule may be set to evaluate ordering of elements in a digital file/document based on visual order (as opposed to an XML order). For example, a slide-based presentation document may comprise an ordered arrangement of portions of digital content. With traditional importation applications/services, an XML order may be utilized to determine how to present imported content. For instance, if a user added a first digital element and then added a second digital element above the first digital element, the XML order may indicate to an application/service that the first digital element should be placed above the second digital element. That is, the XML order may not be a true representation of a visual order of the digital elements within a digital file/document. An exemplary inference determination rule may be set to detect content elements within a digital file based on coordinates of the content portion. The conversion data model may evaluate coordinates and placement of content portions to generate authoring inferences for a layout of a digital file/document. An exemplary authoring inference (or inferences) may be generated to indicate visual positioning of content portions within a digital document to assist with conversion of file data from one format to another.

In another example, an exemplary inference determination rule may be set to evaluate content formatting (e.g. text) and a level of emphasis placed on specific content portions within a digital file/document. An exemplary inference determination rule for evaluating formatting and emphasis of content may cause the conversion data model to execute processing operations that may categorize content portions in categories of emphasis to best assist an application/service with importing file data of a different file format. For example, inference determination rules may be set that apply scoring to content portions based on formatting (e.g. size/font size, bolding, italicizing, underlining, highlighting, etc.), where the scoring can be translated between different applications/services even if the importing application/service does not have all the editing capabilities of that are associated with the application/service that created the digital file. For instance, the conversion data model may create a representation of a content portion that best aligns with the original intended formatting of the content in the digital file that is being imported based on an emphasis analysis that evaluates attributes of the formatting of the content portion. Heuristic analysis (e.g. scoring) may be applied that group different trends for content formatting according to a level of emphasis. In one example, scoring (e.g. +1 or −1) may be assigned to specifically identified attributes of formatted content. For example, if an original content portion is subscript, scoring processing may assign −1 for that attribute as compared with a larger font size. If that original content portion is highlighted, scoring processing may assign +1 for that attribute. If that original content is also italicized, scoring processing may assign +1. An aggregate score may be generated for a content portion that can be utilized as an authoring inference to best emphasize content in the importing application/service. In alternate examples, inference determination rules may also be set to identify formatting capabilities of different applications/services. In examples where similar formatting capabilities exist for an importing application/service, the conversion data model may be configured to align the imported representation of the digital file as close as possible with the original content portion.

In further examples, exemplary inference determination rules may be set to detect specific content and/or formatting within a digital file. Types of content detection rules that may be configured and applied comprise but are not limited to: page ordering (e.g. slide ordering of slide-based presentations), image detection, facial recognition detection, caption detection, title detection, header/footer detection, composite objects (e.g. grouping) detection, among other examples. In one example, an inference determination rule is set to evaluate section detection within a digital file/document. For example, a word processing document or a slide-based presentation document, may comprise sections/sub-sections. An exemplary inference determination rule, when executed by the conversion data model, may be configured to parse content of a digital file/document and identify sections, sub-sections, etc. Further, inference determination rules may be set for determining how to convert sections/sub-sections to a representation within an importing application/service. For example, when subsequent slides start with the same heading, content of those slides may be merged into one section (e.g. a single content portion). It is to be understood that different sets of rules may be similarly set without departing from the spirit of the present disclosure. When content having a section is converted to an authoring application/service, the authoring application/service may analyze the content and create a representation of that section (e.g. of slides) in a manner that is best for use in the authoring application/service. For instance, processing described herein analyzes a section of slides, identifies that the sub-sections within that section are all very closely related and merge the slide sub-sections into one authoring section. In an alternate example, the conversion data model may make authoring inferences that determine to modify a representation of such content by adding/removing portions of content (e.g. that are duplicitous).

In generating a representation of content for importation, an exemplary conversion data model may be configured to maintain understanding for any form/representation of a digital file/document (e.g. the original file, modified representations that are imported). For example, different versions of content portions and/or files may be mapped to different applications/services. An exemplary authoring inference may be generated as to which application/service is being used to import a digital file, where the data conversion model has the capability to tailor (or manipulate) content portions for specific applications/services. For example, when the representation of the slide-based section, which is created by the authoring application/service, is then imported back to a slide-based presentation service, examples described herein enable the slide-based presentation service to recognize that the authoring content can be broken out into a section and multiple sub-sections (e.g. multiple different slides). This cross-over between different applications/services increases processing efficiency and user interaction (and productivity) when working between different application/services. An exemplary conversion data model may be configured to manage a mapping of representations/versions of digital files for application/services. In another example, the conversion data model may interface with another computing device/data storage that manages an exemplary mapping.

In another example, an exemplary inference determination rule may be set to evaluate types of content portions for importation. For example, titles, captions, headers, footers, footnotes, body paragraphs, etc. may be relevant to identify when importing content into specific applications/services (e.g. an authoring service). The conversion data model may be utilized to evaluate different attributes (e.g. formatting, layout, associations, similarities, semantic analysis, etc.) For instance, exemplary inference determination rules can be set to evaluate coordinates of content, relationships with nearby content portions, user comments/notations, and/or rules set specific to identifying specific types of content (e.g. captions, titles, headers, footers, etc.). For example, a rule may be set similar to the following: when captions are not styled, look at the text before and after images and if they start with "caption/figure/etc." and have some text properties, then reconstruct as captions. In some instances, context of content can be analyzed to generate a caption, title, etc. from various content portions of a digital file even when a caption or title is not readily provided in the digital file. Authoring inferences may be generated that indicate types of content and/or whether certain content is fit for importation as a heading, caption, title, etc.

Furthermore, another example of an inference determination rule may be a rule set to evaluate object groupings. Object groupings may reference detection of associations between words, texts objects, image objects, interactive media objects/links, etc. Associations may be identified through visual analysis, evaluation of properties associated with objects (including coordinates indicating placement, indications of layering, linked association, etc. and/other metadata associated with a digital file/document. For instance, a user may have grouped a number of objects (e.g. images) in the authoring application/service but a traditional word processing application may just import the image content without maintaining the grouping arrangement created in the authoring application/service. An authoring inference may be generated that indicates that objects in a digital file pertain to a group of objects and should remain grouped on importation.

Additional inference determination rules may pertain to evaluation of metadata associated with digital files/documents. For example, rules may be set to evaluate timestamp data, dates of modifications, versions of files, specific properties of content portions, user account associations, etc. In addition to being useful for generation of authoring inferences, such data may also be useful for telemetric analysis and update of an exemplary conversion data model.

In some examples, the conversion data model may be a component of an exemplary application/service. In other examples, the conversion data model is a separate service that interfaces with application/services when file data is to be input into specific applications/services. In examples where the conversion data model is associated with a separate service, flow of method 100 may proceed to processing operation 106, where authoring inferences are output to an importing application/service. An exemplary importing application/service (e.g. authoring service) may utilize the generated authoring inferences to generate representation(s) of a digital file. In alternate examples of method 100, an exemplary conversion data model may be configured to utilize generated authoring inferences to automatically create a representation(s) of a digital file that is tailored for importation to an exemplary application/service.

Flow may proceed to processing operation 108, where a converted representation of the digital file is surfaced through a user interface of an importing application/service. As indicated in the foregoing, representation of the digital file may be surfaced based on analysis of the generated authoring inferences. As further indicated in the foregoing, an importing application/service may utilize an exemplary data model for generation of a converted digital representation and/or an exemplary data conversion model may be utilized to generate an exemplary representation and transmit that representation to an importing application/service. An exemplary representation of a digital file may be generated by an exemplary application/service or the conversion data model on behalf of the application/service. Generation of the representation of the digital file tailors the representation of the digital file for the productivity service based on the generated authoring inferences. In one example, generating of the representation of the digital file further comprises modifying, to work with the productivity service, one or more of: a layout of the content of the digital file and the formatting of the content of the digital file. In another example, generating of the representation of the digital file comprises converting multiple content portions of the digital file to a merged content portion in the representation of the digital file. As an example, an exemplary representation of a digital file may be surfaced through a user interface of an exemplary application/service (e.g. productivity service).

Flow of method 100 may proceed to decision operation 110, where it is determined if a new import request is received. For example, a user may request import another digital file or change applications/services and make a request for importation in a different application/service. In examples where no additional importation occurs, flow of decision operation 110 branches NO and processing of method 100 remains idle until subsequent processing is to occur. In examples where a new importation is requested, flow of decision operation 110 branches YES and processing of method 100 returns to processing operation 102.

For instance, decision operation 110 may comprise receiving a file corresponding with the representation of the digital file for importation into a different productivity service. In such an instance, authoring inferences may be generated for conversion of the file (corresponding with the representation) to a file format of the different productivity service, for example, based on an analysis of the content of the file, formatting of the content and a layout of the content. Exemplary authoring inferences may identify previous versions/formatting of content, evaluate changes to those portions made in an exemplary productivity service (e.g. authoring service) and generate authoring inferences to assist with conversion of the representation to a different file format.

Moreover, examples described herein further extend to generation of new endpoints (in application/service user interfaces) that enable a plurality of different application/services to provide the functionality described herein. For instance, an authoring application/service may be configured to receive and work with content (e.g. different file formats) from different applications/services but other types of applications/services may not be configured to do the same. In one example, a user may wish to convert a file from an authoring application/service to utilize in a word processing application service. Exemplary endpoints for accessing an exemplary conversion data model as well as processing operations described herein may be introduced into different application/services. In some instances, introduction of an exemplary endpoint may comprise adaptation to an existing user interface to better identify the described functionality for users. Such extensibility may be utilized to increase processing efficiency and user interaction (and productivity) when working between different application/services. As referenced above, examples described herein are configured to work with any type of application/service.

Figure 2:
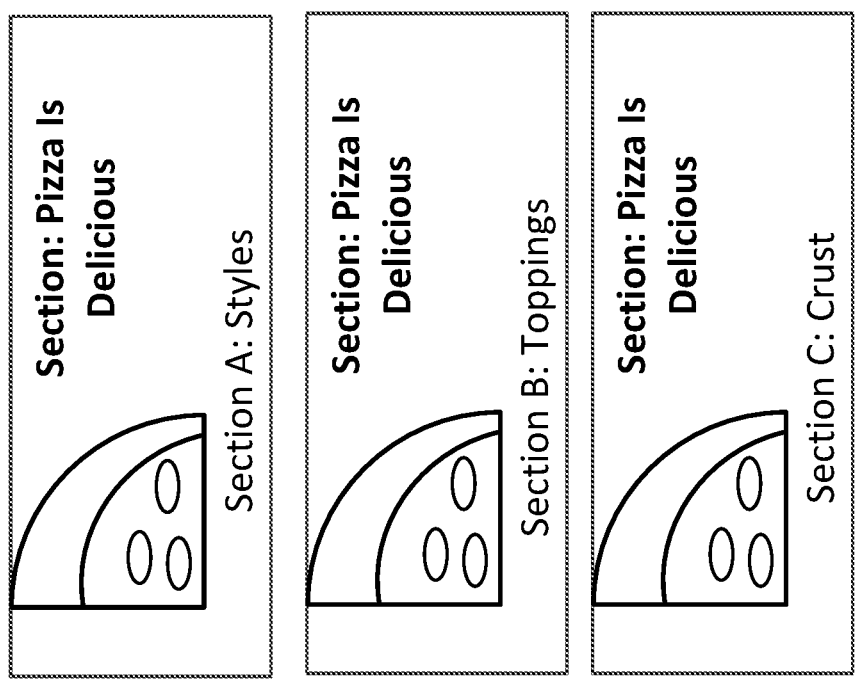
FIG. 2 illustrates an exemplary process flow for converting data between different file formats with which aspects of the present disclosure may be practiced.

FIG. 2 illustrates an exemplary process flow 200 for converting data between different file formats with which aspects of the present disclosure may be practiced. Processing flow 200 illustrates a result of application of authoring inferences, where generation of exemplary authoring inferences is described in the foregoing description of method 100 (FIG. 1). Process flow 200 illustrates a visual example where an original digital file is a slide-based presentation 202 that comprises multiples slides for a section. In the referenced example, a user may wish to import the slide-based presentation to an exemplary authoring application/service. Based on evaluation of the original digital file (e.g. slide-based presentation 202), an exemplary conversion data model may be configured to apply exemplary inference determination rules to determine that the slide comprises a section of content (and multiple related sub-sections). An exemplary resulting authoring inference may be generated that indicates that content of that section of slides may be combined into an exemplary representation 204 that is generated for importation of the slide-based presentation in the authoring application/service. In another example, a user may wish to import a digital document created in the authoring application/service to a slide-based presentation in a slide-based presentation service. The digital document in the authoring application/service may comprise the exemplary representation 204. When the conversion data model applies inference determination rules for a such a conversion, the conversion data model may generate an authoring inference that identifies an original formatting and layout of the content in the representation 204, where a representation in the slide-based presentation service may again break out the section/sub-sections into multiple different slides. Alternatively, exemplary inference determination rules may determine it may be best to leave the content as represented in the exemplary representation 204 when the representation 204 is imported back to the slide-based presentation. For instance, the conversion data model may receive additional content/telemetric data indicating that the user prefers the layout and formatting of the generated representation 204 as compared with the layout and formatting of the original slide-based presentation.

In most instances, the application/service (and/or the conversion data model) is configured to automatically resolve such conflicts based on the generated authoring inferences. In alternative examples, an exemplary application/service may be configured to utilize the authoring inferences to provide a user with an opportunity to disambiguate which representation of a digital file (or content portions) that a user prefers for importation. For example, a manual conflict resolution prompt may be surfaced. Furthermore, authoring inferences may be utilized by the application/service (and/or other applications/services) to generate suggestions for a user. In one example, exemplary suggestions may be surfaced in a user interface of an application/service, for example, at a time of importation of a converted representation of a digital file.

Figure 3:
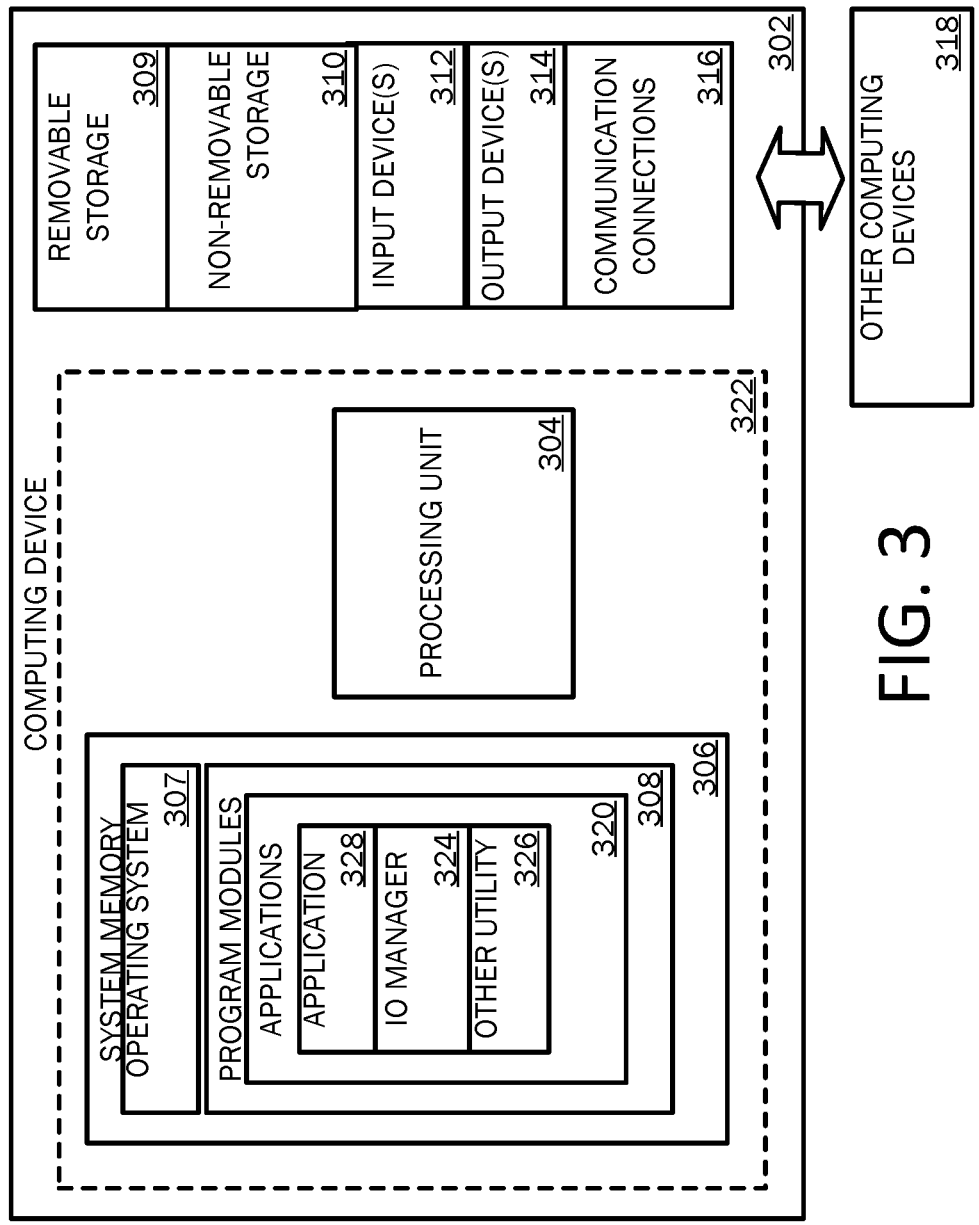
FIG. 3 is a block diagram illustrating an example of a computing device with which aspects of the present disclosure may be practiced.
Figure 4A:
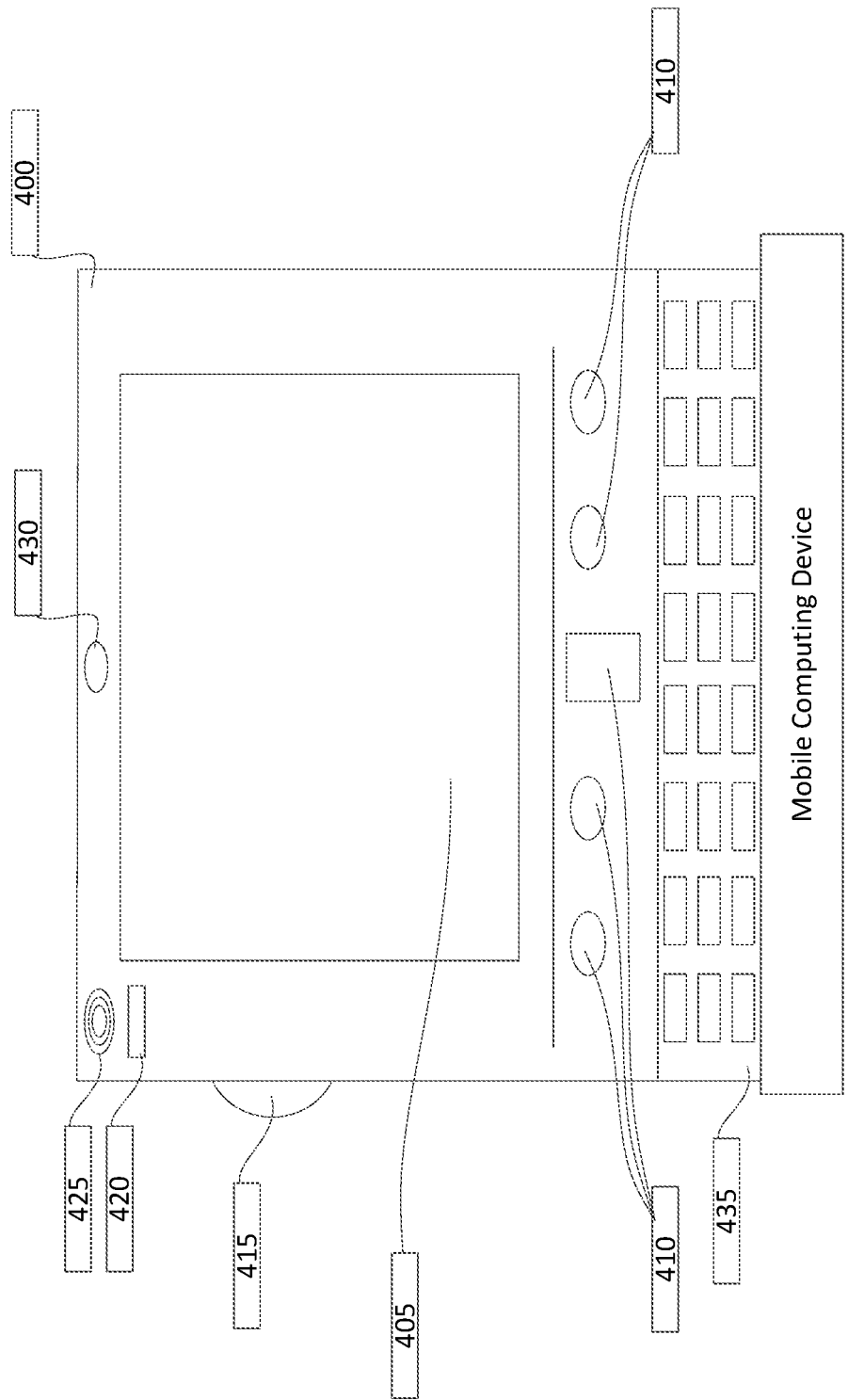
FIGS. 4A and 4B are simplified block diagrams of a mobile computing device with which aspects of the present disclosure may be practiced.
Figure 4B:
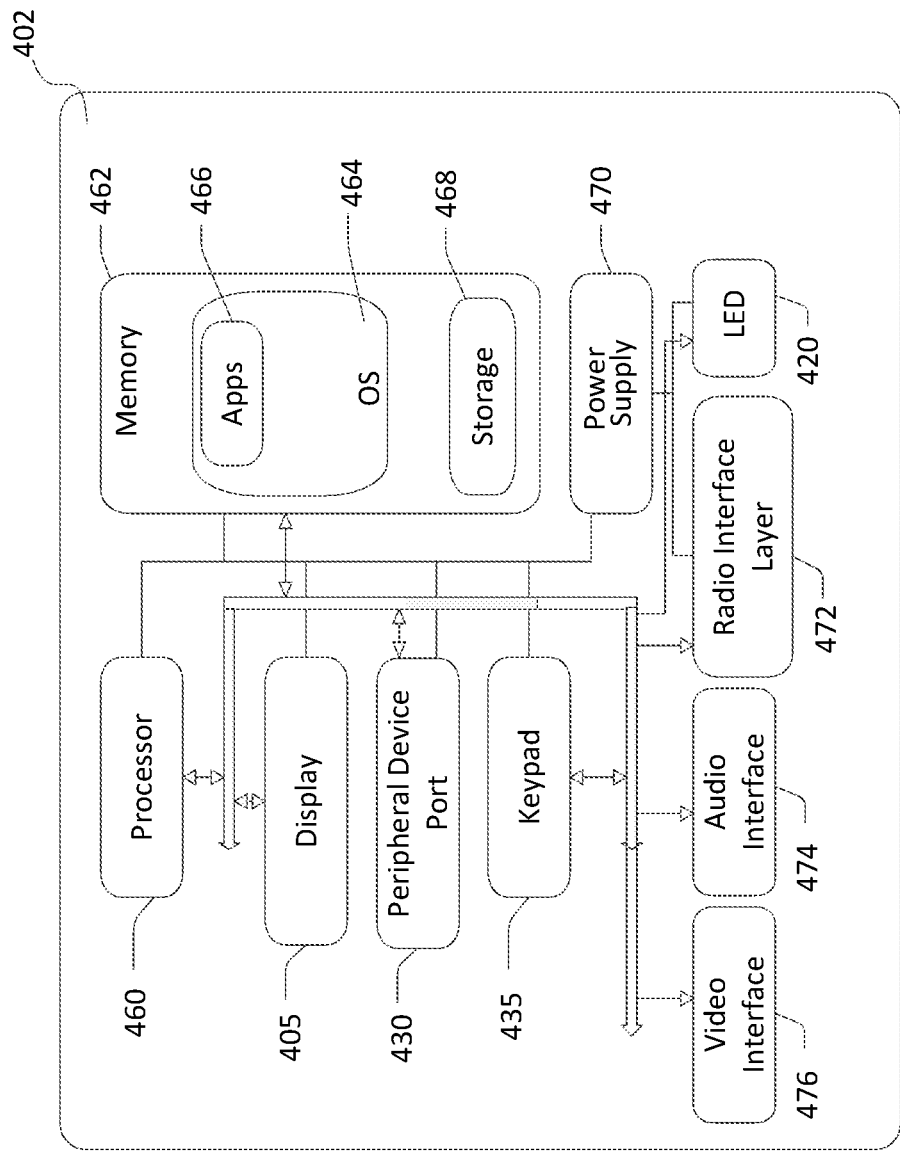
Figure 5:
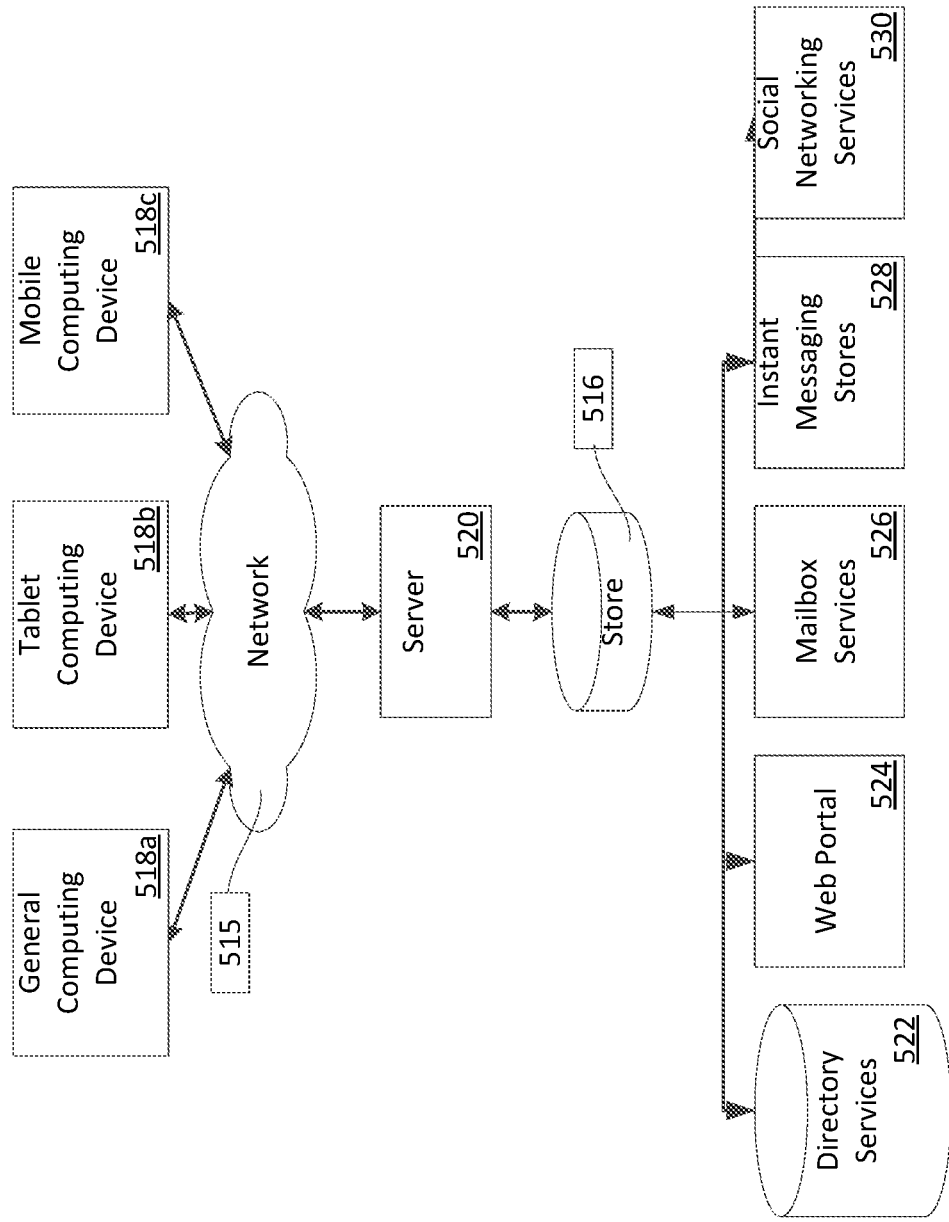
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for intelligent inferences of authoring from analysis of properties of a digital document as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a laptop, a slate, a laptop computer, and the like, with which examples of the invention may be practiced. Mobile computing device 400 may be an exemplary computing device configured for intelligent inferences of authoring from analysis of properties of a digital document as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for intelligent inferences of authoring from analysis of properties of a digital document as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
  identifying a digital file for importation of content into an authoring service;
  applying a trained model that is configured to automatically generate one or more authoring inferences suggesting data transformation of content from the digital file into a format for inclusion in a digital presentation object that is presentable in the authoring service, wherein the generating of the one or more authoring inferences comprises:
    determining that an image portion of the digital file is missing a caption,
    determining that a textual portion of the digital file is proximate to the image portion based on analysis of locational coordinates of one or more content sections of the digital file, and automatically generating an authoring inference, of the one or more authoring inferences, providing a suggestion to generate a caption for the image portion using the textual portion based on a determination that the image portion is missing a caption and a determination that the textual portion is proximate to the image portion;

generating, based on analysis of the authoring inference, the digital presentation object that comprises an aggregated representation of the textual portion and the image portion presenting the textual portion as a caption for the image portion; and transmitting, to the authoring service, data for rendering the digital presentation object.

2. The method of claim 1, wherein the generating of the one or more authoring inferences further comprises: generating a determination of a level of emphasis of formatting for the textual portion, wherein the determination of the level of emphasis of formatting for the textual portion is an aggregate heuristic score derived from an aggregation of scoring metrics each assigned to a specific formatting attribute identified for the textual portion of the digital file, and wherein the generating of the digital presentation object further comprises modifying, based on the determination of the level of emphasis of formatting for the textual portion, formatting attributes associated with the textual portion to be representative of the caption for the image portion.

3. The method of claim 2, wherein the trained data model is a machine learning model that is further configured to map the level of emphasis of formatting for the textual portion to a specific format, of a plurality of formats, of the digital presentation object of the authoring service.

4. The method of claim 1, wherein the generating of the one or more authoring inferences further comprises: generating a determination of a level of emphasis of formatting for the image portion, wherein the determination of the level of emphasis of formatting for the image portion is an aggregate heuristic score derived from an aggregation of scoring metrics each assigned to a specific formatting attribute identified for the image portion of the digital file, and wherein the generating of the digital presentation object further comprises modifying, based on the determination of the level of emphasis of formatting for the image portion, formatting attributes associated with the image portion to be representative of the aggregate representation.

5. The method of claim 4, wherein the trained data model is a machine learning model that is further configured to map the level of emphasis of formatting for the textual portion to a specific format, of a plurality of formats, of the digital presentation object of the authoring service.

6. The method of claim 1, wherein the digital presentation object, of the authoring service, is a content card that collectively present a storyline for a digital presentation document of the authoring service.

7. The method of claim 1, further comprising: detecting export of the digital presentation object in a different application or service; and in response to detecting the export of the digital presentation object, converting content of the digital presentation object back to an original file format for rendering in the different application or service.

8. A system comprising:
at least one processor; and
a memory, operatively connected with the at least one processor, storing computer-executable instructions that, when executed by the at least one processor, causes the at least one processor to execute a method that comprises:

identifying a digital file for importation of content into an authoring service;

applying a trained model that is configured to automatically generate one or more authoring inferences suggesting data transformation of content from the digital file into a format for inclusion in a digital presentation object that is presentable in the authoring service, wherein the generating of the one or more authoring inferences comprises:

determining that an image portion of the digital file is missing a caption, determining that a textual portion of the digital file is proximate to the image portion based on analysis of locational coordinates of one or more content sections of the digital file, and automatically generating an authoring inference, of the one or more authoring inferences, providing a suggestion to generate a caption for the image portion using the textual portion based on a determination that the image portion is missing a caption and a determination that the textual portion is proximate to the image portion;

generating, based on analysis of the authoring inference, the digital presentation object that comprises an aggregated representation of the textual portion and the image portion presenting the textual portion as a caption for the image portion; and transmitting, to the authoring service, data for rendering the digital presentation object.

9. The system of claim 8, wherein the generating of the one or more authoring inferences further comprises: generating a determination of a level of emphasis of formatting for the textual portion, wherein the determination of the level of emphasis of formatting for the textual portion is an aggregate heuristic score derived from an aggregation of scoring metrics each assigned to a specific formatting attribute identified for the textual portion of the digital file, and wherein the generating of the digital presentation object further comprises modifying, based on the determination of the level of emphasis of formatting for the textual portion, formatting attributes associated with the textual portion to be representative of the caption for the image portion.

10. The system of claim 9, wherein the trained data model is a machine learning model that is further configured to map the level of emphasis of formatting for the textual portion to a specific format, of a plurality of formats, of the digital presentation object of the authoring service.

11. The system of claim 8, wherein the generating of the one or more authoring inferences further comprises: generating a determination of a level of emphasis of formatting for the image portion, wherein the determination of the level of emphasis of formatting for the image portion is an aggregate heuristic score derived from an aggregation of scoring metrics each assigned to a specific formatting attribute identified for the image portion of the digital file, and wherein the generating of the digital presentation object further comprises modifying, based on the determination of the level of emphasis of formatting for the image portion, formatting attributes associated with the image portion to be representative of the aggregate representation.

12. The system of claim 11, wherein the trained data model is a machine learning model that is further configured to map the level of emphasis of formatting for the textual portion to a specific format, of a plurality of formats, of the digital presentation object of the authoring service.

13. The system of claim 8, wherein the digital presentation object, of the authoring service, is a content card that collectively present a storyline for a digital presentation document of the authoring service.

14. The system of claim 8, wherein the method, executed by the at least one processor, further comprises: detecting export of the digital presentation object in a different application or service; and in response to detecting the export of the digital presentation object, converting content of the digital presentation object back to an original file format for rendering in the different application or service.

15. A computer-implemented method, executed on a computing device, comprising:
    identifying a digital file for importation of content into an authoring service;
    applying a trained model that is configured to automatically generate one or more authoring inferences suggesting data transformation of content from the digital file into a format for inclusion in a digital presentation object that is presentable in the authoring service, wherein the generating of the one or more authoring inferences comprises:
        determining that an image portion of the digital file is missing a caption,
        determining that a textual portion of the digital file is proximate to the image portion based on analysis of locational coordinates of one or more content sections of the digital file, and
        automatically generating an authoring inference, of the one or more authoring inferences, providing a suggestion to generate a caption for the image portion using the textual portion based on a determination that the image portion is missing a caption and a determination that the textual portion is proximate to the image portion;
    generating, based on analysis of the authoring inference, the digital presentation object that comprises an aggregated representation of the textual portion and the image portion presenting the textual portion as a caption for the image portion; and
    rendering, in a graphical user interface (GUI) of the authoring service, the digital presentation object.

16. The computer-implemented method of claim 15, wherein the generating of the one or more authoring inferences further comprises: generating a determination of a level of emphasis of formatting for the textual portion, wherein the determination of the level of emphasis of formatting for the textual portion is an aggregate heuristic score derived from an aggregation of scoring metrics each assigned to a specific formatting attribute identified for the textual portion of the digital file, and wherein the generating of the digital presentation object further comprises modifying, based on the determination of the level of emphasis of formatting for the textual portion, formatting attributes associated with the textual portion to be representative of the caption for the image portion.

17. The computer-implemented method of claim 16, wherein the trained data model is a machine learning model that is further configured to map the level of emphasis of formatting for the textual portion to a specific format, of a plurality of formats, of the digital presentation object of the authoring service.

18. The computer-implemented method of claim 15, wherein the generating of the one or more authoring inferences further comprises: generating a determination of a level of emphasis of formatting for the image portion, wherein the determination of the level of emphasis of formatting for the image portion is an aggregate heuristic score derived from an aggregation of scoring metrics each assigned to a specific formatting attribute identified for the image portion of the digital file, and wherein the generating of the digital presentation object further comprises modifying, based on the determination of the level of emphasis of formatting for the image portion, formatting attributes associated with the image portion to be representative of the aggregate representation.

19. The computer-implemented method of claim 15, wherein the digital presentation object, of the authoring service, is a content card that collectively present a storyline for a digital presentation document of the authoring service.

20. The computer-implemented method of claim 15, further comprising: detecting export of the digital presentation object in a different application or service; and in response to detecting the export of the digital presentation object, converting content of the digital presentation object back to an original file format for rendering in the different application or service.

* * * * *